United States Patent
Oh

(10) Patent No.: US 7,636,984 B2
(45) Date of Patent: Dec. 29, 2009

(54) HINGE UNIT AND AN ELECTRONIC APPARATUS HAVING THE SAME

(75) Inventor: Sang-Kil Oh, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 366 days.

(21) Appl. No.: 11/236,550

(22) Filed: Sep. 28, 2005

(65) Prior Publication Data

US 2006/0075602 A1 Apr. 13, 2006

(30) Foreign Application Priority Data

Oct. 11, 2004 (KR) .................. 10-2004-0080846

(51) Int. Cl.
*E05D 11/06* (2006.01)
(52) U.S. Cl. .............. 16/374; 16/297; 16/327
(58) Field of Classification Search .......... 16/374, 16/327, 328, 331, 332, 366, 371, 334, 297, 16/367, 302, 319, 335, 341, 337, 352; 455/575.3; 379/433.11, 433.12, 433.13
See application file for complete search history.

(56) References Cited

U.S. PATENT DOCUMENTS

| | | | | |
|---|---|---|---|---|
| 6,470,532 B2 * | 10/2002 | Rude | ............................ | 16/335 |
| 6,804,861 B2 * | 10/2004 | Hsu | ............................ | 16/366 |
| 6,845,546 B1 * | 1/2005 | Lu et al. | ........................ | 16/367 |
| 6,928,700 B2 * | 8/2005 | Huong | .......................... | 16/342 |
| 7,096,540 B2 * | 8/2006 | Watanabe et al. | .............. | 16/367 |
| 7,234,204 B2 * | 6/2007 | Liu et al. | ....................... | 16/367 |
| 7,299,526 B2 * | 11/2007 | Kim | .............................. | 16/367 |
| 2002/0073508 A1 * | 6/2002 | Rude | ............................ | 16/341 |
| 2003/0167600 A1 * | 9/2003 | Chien et al. | .................... | 16/367 |
| 2004/0181908 A1 * | 9/2004 | Lu et al. | ........................ | 16/319 |
| 2004/0231105 A1 * | 11/2004 | Ahn | .............................. | 16/367 |
| 2005/0198779 A1 * | 9/2005 | Jung et al. | ..................... | 16/367 |
| 2005/0283949 A1 * | 12/2005 | Lu et al. | ........................ | 16/367 |
| 2006/0107492 A1 * | 5/2006 | Chang et al. | ................... | 16/367 |
| 2007/0033771 A1 * | 2/2007 | Hung | ........................... | 16/367 |

FOREIGN PATENT DOCUMENTS

| | | | |
|---|---|---|---|
| JP | 11-247837 | | 9/1999 |
| JP | 2000064701 A | * | 2/2000 |
| JP | 2000-297574 | | 10/2000 |
| KR | 2000-0001184 | | 1/2000 |
| KR | 2003-0065900 | | 8/2003 |

* cited by examiner

*Primary Examiner*—Victor Batson
*Assistant Examiner*—Jeffrey O'Brien
(74) *Attorney, Agent, or Firm*—Roylance, Abrams, Berdo & Goodman, L.L.P.

(57) ABSTRACT

A hinge unit comprises a supporting bracket, a hinge shaft assembly, and a pressing member. The hinge shaft assembly is connected to the supporting bracket to rotate between first and second positions. The pressing member presses the hinge shaft assembly toward the first position (for example, a closed position) when the hinge shaft assembly is located in the first position.

6 Claims, 5 Drawing Sheets

HINGE UNIT AND AN ELECTRONIC APPARATUS HAVING THE SAME

CROSS-REFERENCE TO RELATED APPLICATIONS

This application claims the benefit under 35 U.S.C. § 119(a) of Korean Patent Application No. 2004-80846, filed Oct. 11, 2004, in the Korean Intellectual Property Office, the entire disclosure of which is hereby incorporated by reference.

BACKGROUND OF THE INVENTION

1. Field of the Invention

The present invention relates to a hinge unit and an electronic apparatus having the same. More particularly, the present invention relates to a hinge unit that is capable of holding a rotation member of a main body of an electronic apparatus into tight contact with the main body when the rotation member is closed, and an electronic apparatus having such a hinge unit.

2. Description of the Related Art

Portable electronic apparatuses such as camcorders, digital cameras and compound mobile phones have a liquid crystal display (LCD) panel for displaying an image. The LCD panel is rotatably mounted on the main body of the apparatus with a hinge that either has a single axis (uniaxially) or two axes (biaxially).

An LCD panel of a camcorder, for example, may be mounted to a main body by a biaxial hinge unit with first and second hinge axes. The first and second axes are at different angles with respect to each other so that the LCD panel can rotate independently about the first and the second axes by a certain angle with respect to the main body.

Such a biaxial hinge unit supports the LCD panel so that the LCD panel can pivot on the first axis to open and close the panel with respect to the main body of the apparatus. The opened LCD panel can then rotate about the second axis, which is typically perpendicular to the first axis.

In this type of structure, when the LCD panel is rotated about the first axis to close the panel, the display side of the LCD panel contacts the main body.

The LCD panel may not close completely, however, and may remain slightly separated from the main body due to the elasticity of a friction spring that is mounted on the first axis to provide friction to the hinge unit.

To prevent such a loose contact between the LCD panel and the main body, the main body and the LCD panel include a locking device. In other words, a dedicated locking device is provided, in addition to the friction spring that is provided on the first axis to hinder rotation of the LCD panel. The locking device holds the LCD panel close to the main body when the LCD panel is closed.

Including a locking device for the LCD panel increases the number of parts and the size of the apparatus. Thus, the locking device hinders portability. That is, the locking device makes the portable electronic apparatus larger and heavier.

Accordingly, there is a need for an improved hinge unit for portable electronic apparatuses.

SUMMARY OF THE INVENTION

An aspect of the present invention is to address at least the above problems and/or disadvantages. Accordingly, an aspect of the present invention is to provide a hinge unit that maintains the rotational position of a rotation member of an apparatus, and an electronic apparatus having the same.

In an exemplary embodiment of the present invention, a hinge unit comprises a supporting bracket, a hinge shaft assembly, and a pressing member. The hinge shaft assembly is connected to the supporting bracket and rotates between a first position and a second position. The pressing member presses the hinge shaft assembly towards the first position.

The pressing member may selectively contact the hinge shaft assembly, depending on the rotational position of the hinge shaft assembly, so that the pressure applied to the hinge shaft assembly is released when the hinge shaft assembly is not in the first position.

A first end of the pressing member may be fixed to the supporting bracket and a second end of the pressing member may elastically contact the hinge shaft assembly when the hinge shaft assembly is in the first position.

The hinge shaft assembly may have a cam part formed by partly extending an outer circumference of the hinge shaft assembly to contact the second end of the pressing member only when being moved to the first position.

The hinge shaft assembly may comprise a hinge bracket, a hinge shaft, and a cam member. A first end of the hinge shaft may be fixed to the hinge bracket and the second end of the hinge shaft may be rotatably connected to the supporting bracket. The cam member may rotate in engagement with the hinge shaft, and the cam member may form the cam part that contacts the second end of the pressing member.

The hinge shaft assembly may further comprise a rotational angle controller that is engaged with and rotates with the hinge shaft. The rotational angle controller contacts the supporting bracket according to the rotational position of the hinge shaft assembly to restrict the rotational angle of the hinge shaft assembly.

The hinge shaft assembly may further comprise a friction spring disposed between the hinge shaft and the supporting bracket to provide friction when the hinge shaft assembly is rotated.

The hinge unit may further comprise a locking part for defining a certain rotational position of the hinge shaft assembly and restricting the hinge shaft assembly from freely rotating when located in a certain rotated position.

The locking part may comprise a locking member and a locking recess. The locking member is formed on the supporting bracket and is a locking projection that protrudes toward the hinge shaft assembly. The locking recess is formed at the hinge shaft assembly and engages the locking projection in the first position.

The locking recess may be formed in the cam member, and the cam member mounted to the hinge shaft assembly.

In another exemplary embodiment of the present invention, a hinge unit comprises a supporting bracket, a first hinge shaft assembly, a second hinge shaft assembly, and a pressing member. The first hinge shaft assembly is mounted to the supporting bracket to rotate between first and second positions. The second hinge shaft assembly is mounted to the first hinge shaft assembly to rotate by a certain angle. The pressing member presses the first hinge shaft assembly toward the first position when the first hinge shaft assembly is located in the first position.

A first end of the pressing member may be fixed to the supporting bracket and a second end of the pressing member may elastically contact the hinge shaft assembly when the hinge shaft assembly is in the first position.

The hinge shaft assembly may have a cam part formed by partly extending an outer circumference of the hinge shaft assembly to contact the second end of the pressing member only when being moved to the first position.

The hinge shaft assembly may comprise a hinge bracket, a hinge shaft, and a cam member. A first end of the hinge shaft may be fixed to the hinge bracket and the second end of the hinge shaft may be rotatably connected to the supporting bracket. The cam member may rotate in engagement with the hinge shaft, and the cam member may form the cam part that contacts the second end of the pressing member.

The hinge shaft assembly may further comprise a rotational angle controller that is engaged with and rotates with the hinge shaft. The rotational angle controller contacts the supporting bracket according to the rotational position of the hinge shaft assembly to restrict the rotational angle of the hinge shaft assembly.

The hinge unit may further comprise a locking part for defining a certain rotational position of the hinge shaft assembly and restricting the hinge shaft assembly from freely rotating when located in a certain rotated position.

The locking part may comprise a locking member and a locking recess. The locking member is formed on the supporting bracket and is a locking projection that protrudes toward the hinge shaft assembly. The locking recess is formed at the hinge shaft assembly and engages the locking projection in the first position.

In another exemplary embodiment of the present invention, an electronic apparatus comprises a main body, a display unit movably mounted to the main body, and a hinge unit connecting the display unit to the main body. The hinge unit comprises a first hinge shaft assembly and a pressing member. The first hinge shaft assembly connects the display unit to the main body so that the display can open and close. The pressing member presses the first hinge shaft assembly so that the display unit tightly contacts the main body of the electronic apparatus when the display unit is closed with respect to the main body.

The hinge unit may further comprise a supporting bracket and a second hinge shaft assembly. The supporting bracket is fixed to the main body and rotatably mounts the first hinge shaft assembly. The second hinge shaft assembly is rotatably mounted to the first hinge shaft assembly and fixed to the display unit.

A first end of the pressing member may be fixed to the supporting bracket and a second end of the pressing member may elastically contact the hinge shaft assembly when the hinge shaft assembly is in the first position.

In the open position, the second hinge shaft assembly may rotate the display unit in a different direction than the first hinge shaft assembly.

The hinge shaft assembly may have a cam part formed by partly extending an outer circumference of the hinge shaft assembly to contact the second end of the pressing member only when being moved to the first position.

The hinge unit may further comprise a locking part for defining a certain rotational position of the hinge shaft assembly and restricting the hinge shaft assembly from freely rotating when located in a certain rotated position.

The locking part may comprise a first locking member and a second locking member. The first locking member has a locking projection that protrudes toward the first hinge shaft assembly and is fixed to the main body. The second locking member is formed at the first hinge shaft assembly to be engaged with the locking projection in the first position.

The second locking member may be a cam member having a cam part pressed by the pressing member in the first position, and a locking recess for engagement with the locking projection.

BRIEF DESCRIPTION OF THE DRAWING FIGURES

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
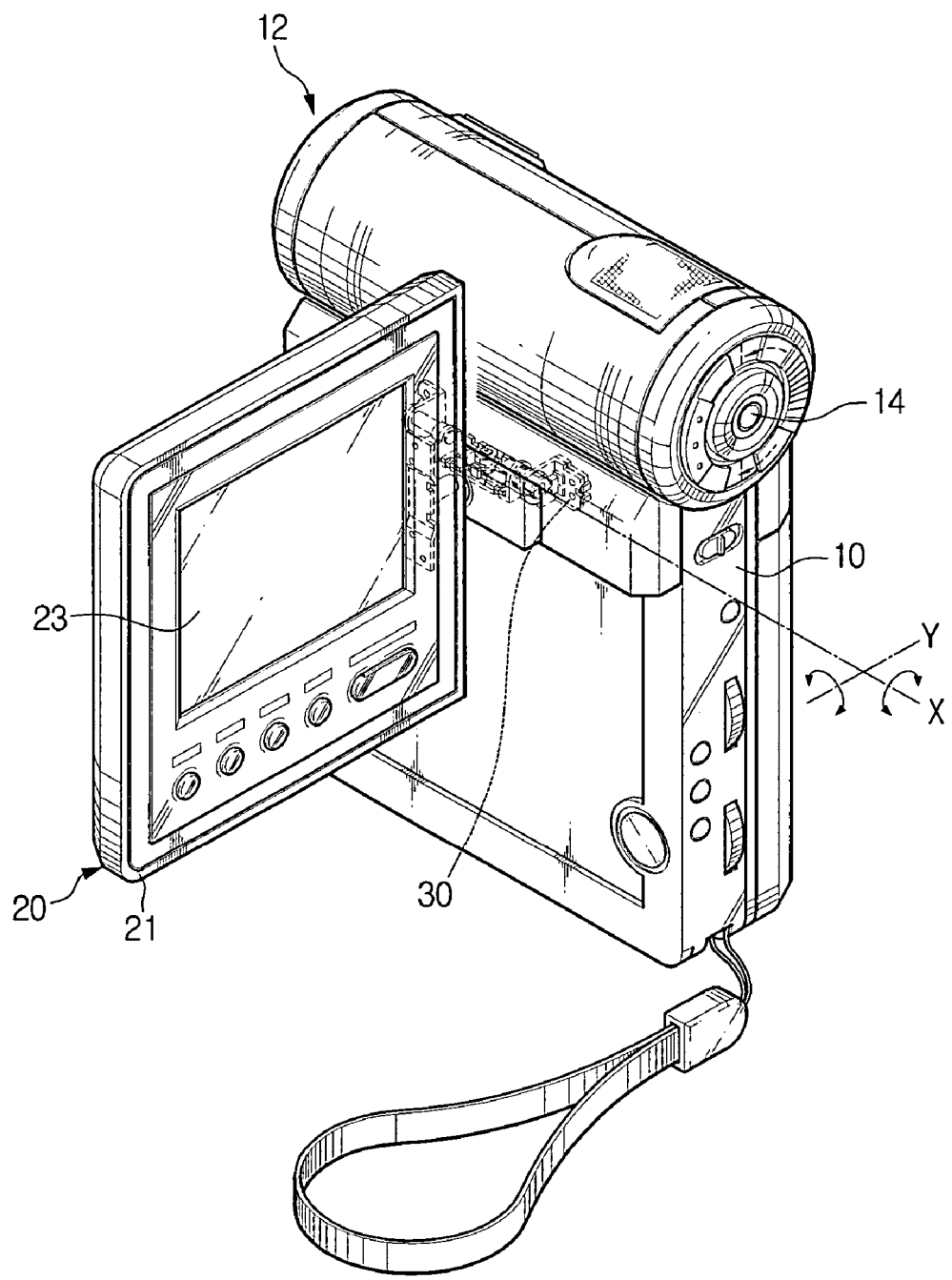
FIG. 1 is a perspective view of an electronic apparatus according to an embodiment of the present invention.

Referring to FIG. 1, a portable photographing apparatus that records and reproduces image data and audio data will be used as an example of an electronic apparatus suitable for use with the exemplary embodiment of the present invention. The electronic apparatus comprises a main body 10, a display unit 20 pivotably mounted to the main body, and a hinge unit 30 for movably supporting the display unit 20.

The main body 10 has a camera part 12 for obtaining image data and a plurality of operation buttons 14. Since the camera part 12 used in the exemplary embodiments is constructed generally the same as camera parts used in conventional camcorders and digital cameras, a detailed description of the camera part is omitted for conciseness. The main body 10 may further comprise a recording/reproducing part for storing and playing image and audio data, and a storage medium.

The display unit 20 shows an image photographed by the camera part 12 and an image reproduced by the storage medium. In this embodiment, the display unit 20 comprises a liquid crystal display (LCD) panel 23 supported by a casing 21.

The hinge unit 30 connects the display unit 20 to the main body 10 so that the display unit 20 can rotate independently about a first axis X and a second axis Y, which are disposed substantially perpendicularly to each other.

Figure 2:
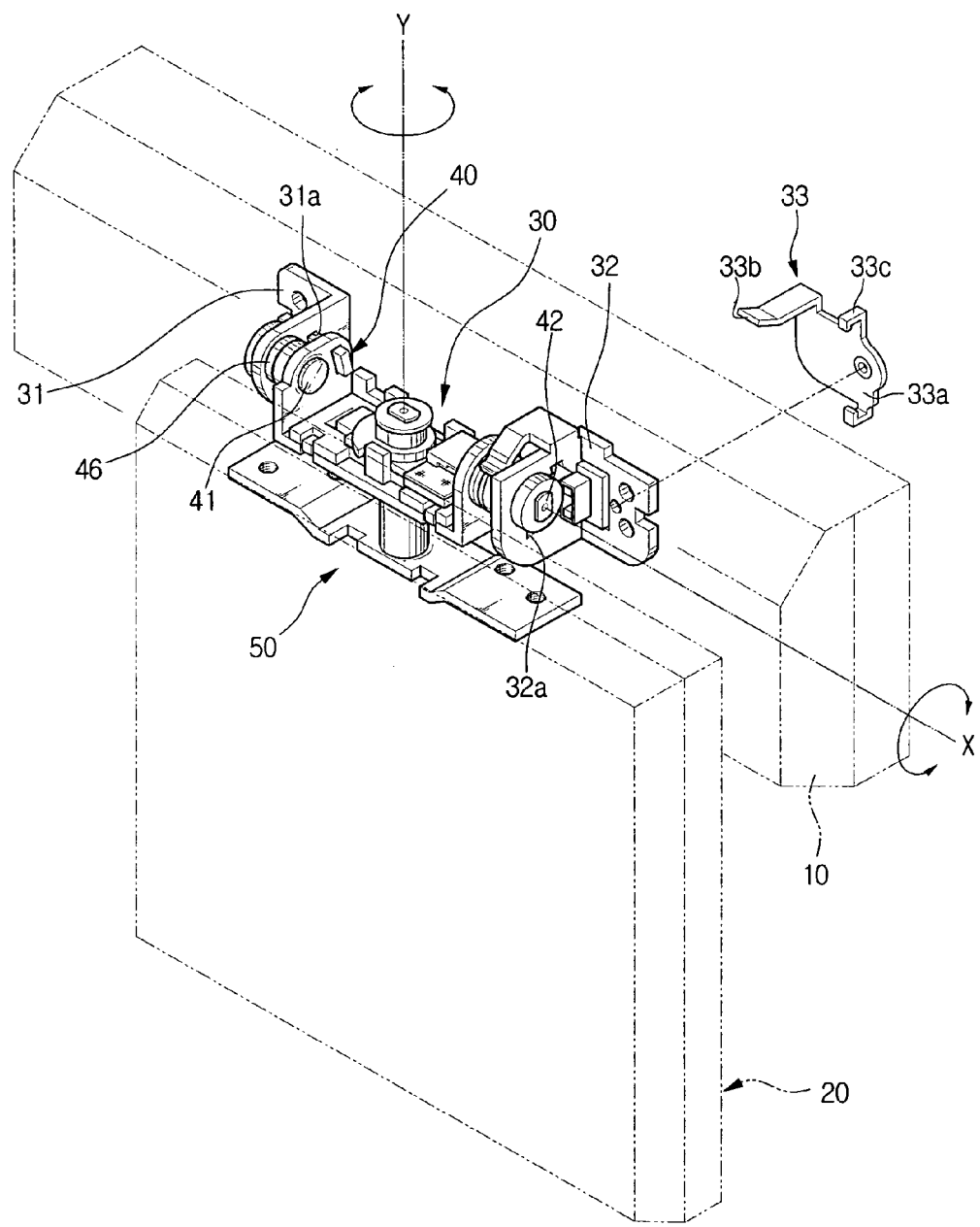
FIG. 2 is a perspective view of the hinge unit of FIG. 1.
Figure 3:
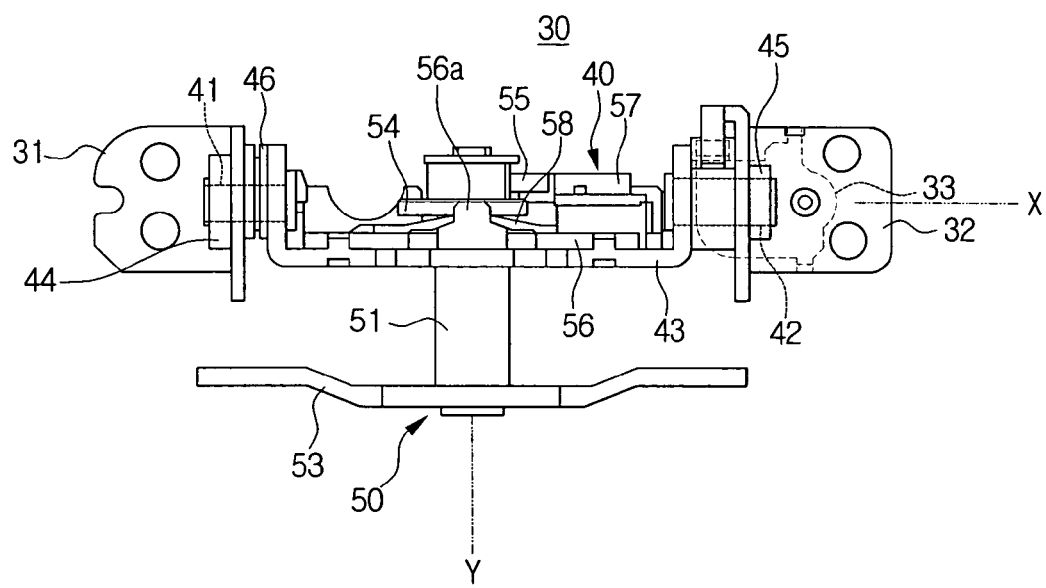
FIG. 3 is a front view of the hinge unit of FIG. 2.
Figure 4:
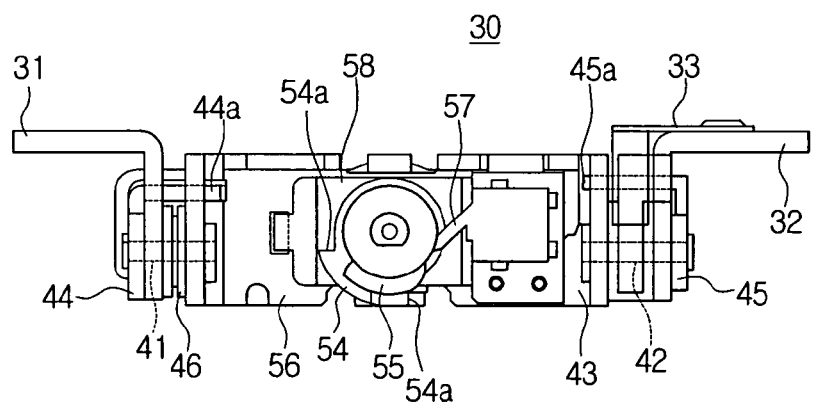
FIG. 4 is a plan view of the hinge unit of FIG. 2.
Figure 5:
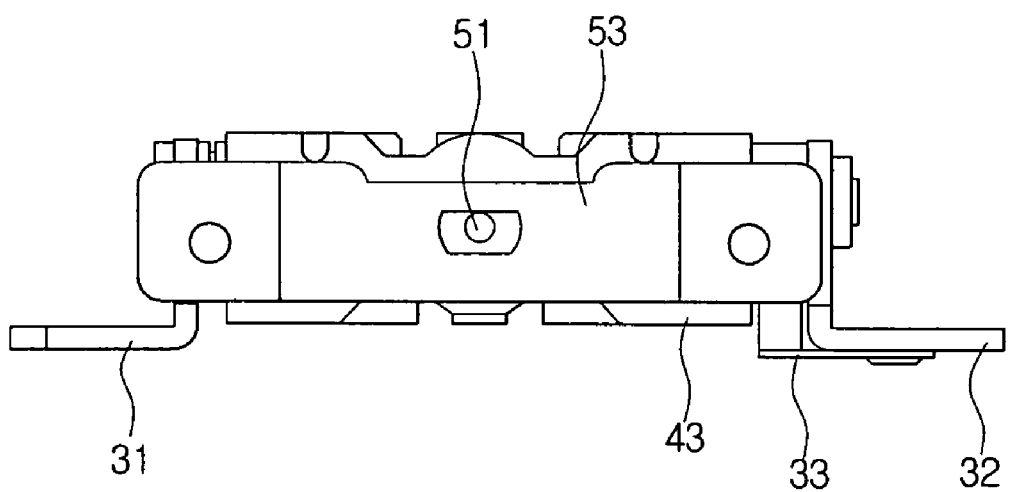
FIG. 5 is a bottom view of the hinge unit of FIG. 2.

As shown in FIG. 2, the hinge unit 30 comprises a pair of supporting brackets 31 and 32 which are fixed to the main body 10, a first hinge shaft assembly 40 pivoting by a certain angle with respect to the supporting bracket 31, a second hinge shaft assembly 50, and a pressing member 33.

The display unit 20 is connected by the first hinge shaft assembly 40 to rotate about the first axis X, thereby being opened and closed with respect to the main body 10. As used herein, a first position refers to a state wherein the display unit 20 is closed with respect to a side of the main body 10, as shown in FIG. 2. A second position refers to a state wherein the display unit 20 is opened with respect to the side of the main body 10, as shown in FIG. 1.

In the second position, where the display unit 20 is opened, the display unit 20 is connected by the second hinge shaft assembly 50 to rotate about the second axis Y by a certain angle. FIG. 1 shows the display unit 20, in the second position, as being rotated by 90° about the second axis Y.

The pair of supporting brackets 31 and 32 are fixed by a fastening means such as a screw to the main body 10 at a certain distance from each other.

The first hinge shaft assembly 40 is rotatably mounted between the supporting brackets 31 and 32. Referring to FIGS. 2 through 5, the first hinge shaft assembly 40 comprises a pair of first hinge shafts 41 and 42, a hinge bracket 43 for connection with the first hinge shafts 41 and 42, controlling members 44 and 45 connected to the first hinge shafts 41 and 42, and a friction spring 46.

A first end of each of the first hinge shafts 41 and 42 is fixed to the hinge bracket 43. The second ends of the hinge shafts 41 and 42 are connected to the supporting brackets 31 and 32, respectively.

The hinge bracket 43 rotatably mounts the second hinge shaft assembly 50. The controlling members 44 and 45 are respectively fixed to the first hinge shaft 41 and 42. The controlling members 44 and 45 respectively have blocking projections 44a and 45a extending therefrom and bent toward the hinge bracket 43. The blocking projections 44a and 45a are connected to the hinge bracket 43, and penetrate through guide slits 31a and 32a formed on the supporting brackets 31 and 32, respectively. Accordingly, when the first hinge shafts 41 and 42 are rotated, the blocking projections 44a and 45a can move only by the length of the guide slits 31a and 32a, thereby restricting the rotational angle of the first hinge shafts 41 and 42 (as best seen in FIGS. 6 and 7).

The friction spring 46 is mounted to either of the first hinge shafts 41 and 42. (In this embodiment, the friction spring 46 is mounted to the first hinge shaft 41.) The friction spring 46 is preferably a compressed leaf spring interposed between the supporting bracket 31 and the hinge bracket 43. The friction spring 46 supplies a frictional force to the first hinge shaft 40 as it is being rotated to prevent the first hinge shaft assembly 40 from freely rotating without any external force. For example, when the display unit 20 is opened, the first hinge shaft assembly 40 may rotate due to the weight of the display unit 20. The frictional force of the friction spring 46 can prevent such unexpected rotation of the first hinge shaft assembly 40.

Figure 6:
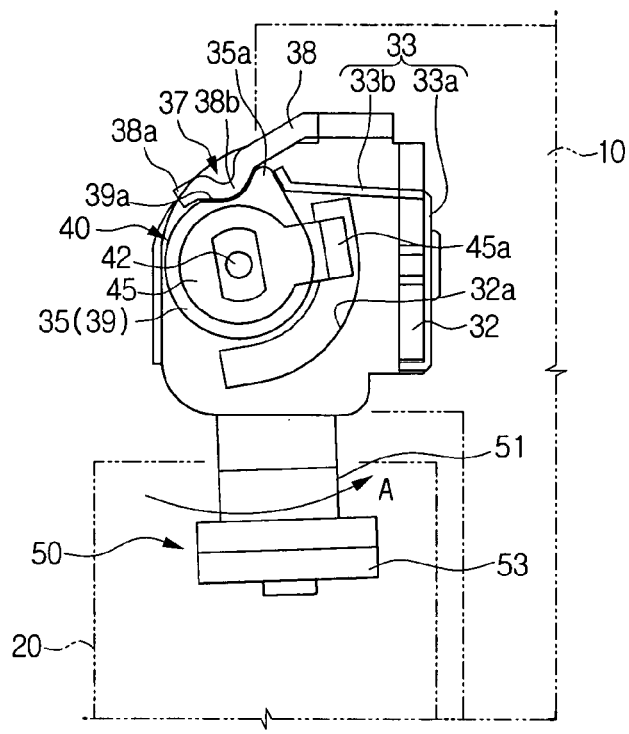
FIGS. 6 and 7 are side views of the hinge unit of FIG. 2.
Figure 7:
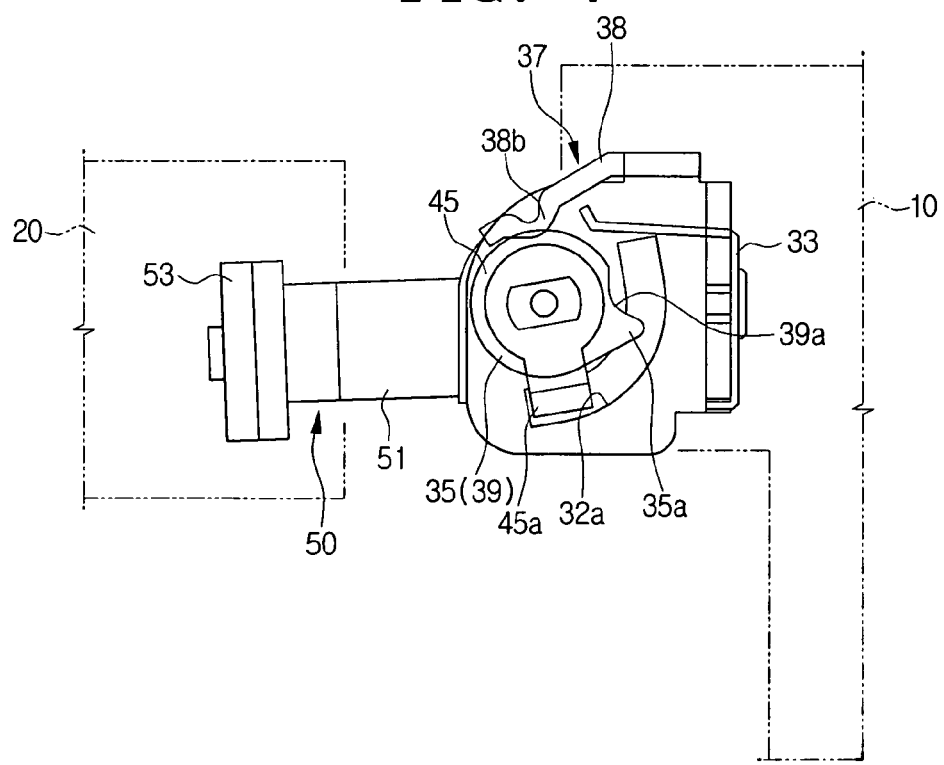

When the display unit 20 is in the first position, the pressing member 33 presses the display unit 20 toward the main body 10 for tight contact between the display unit 20 and the main body 10, as shown in FIGS. 6 and 7. A first end 33a of the pressing member 33 is fixed to the supporting bracket 32 by a fastening member (such as a screw) while a second end 33b is extended to selectively contact and press the first hinge shaft assembly 40. The first end 33a of the pressing member 33 may be further provided with a clamp 33c for clamping the supporting bracket 32.

The first hinge shaft 42 preferably includes a cam member 35 that rotates together with the hinge shaft. The cam member comprises a cam part 35a which is contacts the second end 33b of the pressing member 33 at a certain position. The cam part 35a is formed by extending an outer circumference of the cam member 35 at a certain portion. When the first hinge shaft assembly 40 is in the first position, as shown in FIG. 6, the cam part 35a contacts the pressing member 33 to be pressed toward the first position of the display unit 20. When the first hinge shaft assembly 40 moves to the second position, as shown in FIG. 7, the cam member 35 does not contact the pressing member 33.

As described above, when the first hinge shaft assembly 40 is in the first position, the display unit 20 can be in tight contact with the main body 10 due to the pressing member 33 pressing the cam member 35 towards the first position of the display unit 20, that is, in the direction indicated by the arrow 'A'. Although the cam member 35 is connected to the first hinge shaft 42 in this embodiment, this is only by way of an example. The cam member 35 may be integrally formed with the first hinge shaft 42.

The pressing member 33 may be made of metal and integrally formed with the supporting bracket 32.

The hinge unit 30 preferably includes a locking part 37 for defining a position of the first hinge shaft assembly 40 corresponding to the first position of the display unit 20 and restricts the movement of the first hinge shaft assembly 40. The locking part 37 comprises a first locking member 38 mounted in the supporting bracket 32 and a second locking member 39 engaged with the first locking member 38.

The first locking member 38 is formed integrally with the supporting bracket 32 and has a resilient piece 38a that extends to the first hinge axis 42. The resilient piece 38a has a locking projection 38b that protrudes toward the first hinge shaft 42.

The second locking member 39 has a locking recess 39a for engagement with the locking projection 42b when the first hinge shaft assembly 40 is located in the first position. The second locking member 39 is preferably formed of the same material as the cam member 35, and therefore, the locking recess 39a is disposed adjacent to the cam part 35a.

Consequently, when the display unit 20 is rotated to the first position, the locking projection 38b engages the locking recess 39a, thereby defining the first position of the display unit 20. Accordingly, the locking part 37 prevents the display unit 20 from being opened when in the first position. When the pressing member 33 pushes the cam part 35a in the direction 'A' when the display unit 20 is located in the first position, the display unit 20 can be pressed into tight contact with the main body 10. As a result, the display unit 20 and the main body 10 do not need a dedicated locking member or a hook member as required in the prior art to secure the closed state of the display unit 20.

The second hinge shaft assembly 50 is connected to the hinge bracket 43 to be rotatable by a certain angle. The second hinge shaft assembly 50 comprises a second hinge shaft 51 and a connection bracket 53. The connection bracket 53 is engaged with the second hinge shaft 51 and is connected to the display unit 20. The second hinge shaft 51 rotates with a rotational angle controller 54 and a rotational angle detector 55 in connection therewith. The rotational angle controller 54 has a non-circular shape and has controller hooking projections 54a at both ends thereof. The controller hooking projections 54a are engaged with plate hooking projections 56a of a plate member 56 separately mounted to the hinge bracket 43 to thereby restrict the rotational angle of the second hinge shaft 51.

The rotational angle detector 55 is also non-circular, and is formed as a cam mounted to the second hinge shaft 51 to selectively contact a sensing switch 57 formed at the hinge bracket 43. The rotational angle detector 55 detects the rotational angle of the display unit 20 about the second axis Y to thereby control a state of the image being displayed.

In addition, a leaf spring 58 may be further provided between the rotational angle controller 54 and the plate member 56 to supply friction to the second hinge shaft assembly 50, such that the second hinge shaft assembly 50 is prevented from freely rotating without any external force.

Although not shown, the leaf spring 58 and the rotational angle controller 54 may have locking projections and locking recesses that interlock at certain angles to provide click stops while rotating the second hinge shaft assembly 50.

As can be appreciated from the above description of the hinge unit and an electronic apparatus having the same, according to embodiments of the present invention, when the hinge shaft assembly for opening and closing the display unit 20 with respect to the main body 10 of the electronic apparatus is located in the first position where the display unit 20 is closed, the display unit 20 can be maintained in the closed position by the pressing member 33. Accordingly, the display unit 20 can be kept in tight contact with the main body 10 without being loosened from the main body 10.

Therefore, dedicated locking members or hooks are not required to fix the display unit 20 to the main body 10, thereby saving the number of parts and reducing the size of the apparatus.

While the invention has been shown and described with reference to certain embodiments thereof, it will be understood by those skilled in the art that various changes in form and details may be made therein without departing from the spirit and scope of the invention as defined by the appended claims.

What is claimed is:

1. A hinge unit, comprising:
   a supporting bracket;
   a hinge shaft assembly connected to the supporting bracket to rotate between a first position and a second position;
   a pressing member for pressing the hinge shaft assembly towards the first position when the hinge shaft assembly is in the first position and the pressing member being separated from the hinge shaft assembly when the hinge shaft assembly is in the second position;
   a locking part for defining a certain rotated position of the hinge shaft assembly and restricting free rotation of the hinge shaft assembly located in the first position, the locking part including
   a locking member connected to the supporting bracket and having a locking projection that protrudes toward the hinge shaft assembly; and
   a locking recess formed at the hinge shaft assembly to be engaged with the locking projection in the first position such that the pressing member is not engaged with the locking recess.

2. The hinge unit of claim 1, wherein
   a first end of the pressing member is fixed to the supporting bracket and a second end of the pressing member elastically contacts the hinge shaft assembly when the hinge shaft assembly is in the first position.

3. The hinge unit of claim 2, wherein
   the hinge shaft assembly comprises a cam part that contacts the second end of the pressing member when being moved to the first position.

4. The hinge unit of claim 3, wherein the hinge shaft assembly comprises:
   a hinge bracket;
   a hinge shaft, a first end of the hinge shaft being fixed to the hinge bracket, and a second end of the hinge shaft being rotatably connected to the supporting bracket; and
   a cam member that forms the cam part and rotates in engagement with the hinge shaft.

5. The hinge unit of claim 4, wherein the hinge shaft assembly further comprises:
   a rotational angle controller that rotates in engagement with the hinge shaft, the rotational angle controller contacting the supporting bracket according to a rotated state of the hinge shaft assembly to restrict the rotational angle of the hinge shaft assembly.

6. The hinge unit of claim 4, wherein the hinge shaft assembly further comprises:
   a friction spring disposed between the hinge shaft and the supporting bracket to provide friction when the hinge shaft assembly is rotated.

* * * * *